United States Patent [19]

Graae et al.

[11] 3,887,247

[45] June 3, 1975

[54] BEARING MOUNTING FOR TELESCOPING TUBES

[75] Inventors: Johan E. A. Graae, Elmhurst; Aloysius R. Jamrog; Anthony S. Kelecius, both of Chicago; Donald P. Mingesz, Naperville, al of Ill.

[73] Assignee: The United States of America as represented by the United States Energy Research and Development Administration, Washington, D.C.

[22] Filed: Feb. 25, 1974

[21] Appl. No.: 445,739

[52] U.S. Cl. ................................. 308/6 B
[51] Int. Cl. ............................. F16c 29/04
[58] Field of Search .................. 308/6 A, 6 B, 203; 64/23.7; 214/1 CM

[56] References Cited
UNITED STATES PATENTS 2,023,796  12/1935  Sorensen et al. .................... 308/6 B
3,194,611  7/1965  Mahony ............................. 308/6 B

*Primary Examiner*—Evon C. Blunk
*Assistant Examiner*—Robert Saifer
*Attorney, Agent, or Firm*—John A. Horan; Arthur A. Churm; Paul A. Gottlieb

[57] ABSTRACT

An improved mounting is provided for bearings facilitating movement between two adjacent concentric tubes of a telescoping tube system. Within the interior wall of the outer of the two adjacent tubes there is located a socket having a shelf within. A bearing is mounted on a mounting piece which has a shoulder. With the mounting piece inserted into the socket the shoulder lodges against and rests upon the shelf so that the position of the bearing is maintained when force is applied to it by the inner tube of the two adjacent tubes.

2 Claims, 4 Drawing Figures

BEARING MOUNTING FOR TELESCOPING TUBES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

A telescoping tube assembly consists of a number of concentric tubes that slide one inside another. The inner tube of any two adjacent concentric tubes of such an assembly translates through the outer of the two adjacent concentric tubes. If each tube of the assembly is in some way engaged to the tubes immediately adjacent to it and is permitted to slide within the outer adjacent tube, then the combination of all the tubes so assembled functions as a variable length rod.

The principle of the telescoping tube assembly is useful in mechanical manipulator arms which require the capability of variable arm length to provide a flexible range of reach. Generally, there is coupled to the tube capable of farthest extension from the origin of the manipulator arm, which is usually the tube of smallest diameter, an attachment or arm which can grasp a load or perform some desired function. Such a grasping or loading will impose transverse force on the tube assembly. To improve the ease of movement of the tubes forming the manipulator arm, bearings may be provided to assist movement of one tube within an adjacent tube. It is desirable to improve the stability of the arm and prevent rotation of the tubes under loading. This may be accomplished by using cylindrical rollers for bearings, mounting them on the outer of two adjacent tubes and providing flat tracking surfaces symmetrically positioned on the outer surface of the inner tubes upon which the bearings roll. Rotation of the inner tube is resisted by the contact between the roller bearing and the tracking surface.

Prior art bearings were mounted on a support piece which was then fastened by a fastener such as a screw to the exterior wall of one tube with the bearing extending through a hole in this tube to contact the immediately adjacent inner tube. A plurality of bearings was so mounted on each outer tube. This arrangement was repeated with each pair of adjacent concentric tubes so each tube of all the assembly except the innermost had bearings mounted on it to facilitate movement of the inner adjacent tube. Under transverse loading, transverse force was transmitted through the tube assembly. Each tube transmitted this transverse force to bearings contacting the inner tube in line with the transverse force. From the bearing the force was transmitted to the support piece and ultimately to the fastener which under sufficient loading would tear away from the outer adjacent tube's exterior wall to which the bearing was mounted, thereby limiting the load capability of the telescoping tube manipulator. Note that axial force which developed in the tube would be transferred in part to the bearing, further tending to shimmy the fastener loose.

It is therefore an object of this invention to provide, for bearings which facilitate movement of adjacent concentric tubes of a telescoping tube assembly, an improved mounting which will not tear away under loading.

SUMMARY OF THE INVENTION

A bearing for facilitating movement of an inner tube through an adjacent concentric outer tube of a telescoping tube assembly is mounted on a mounting piece which includes a shoulder. A socket with a shelf adapted to intimately seat the shoulder is located in the interior wall of the outer tube and with the mounting piece inserted into the socket the shoulder rests on the shelf. With the inner tube contacting the bearing, the transverse force of the inner tube's contact maintains the bearing mounting in position in the socket.

DETAILED DESCRIPTION OF THE INVENTION

Figure 1:
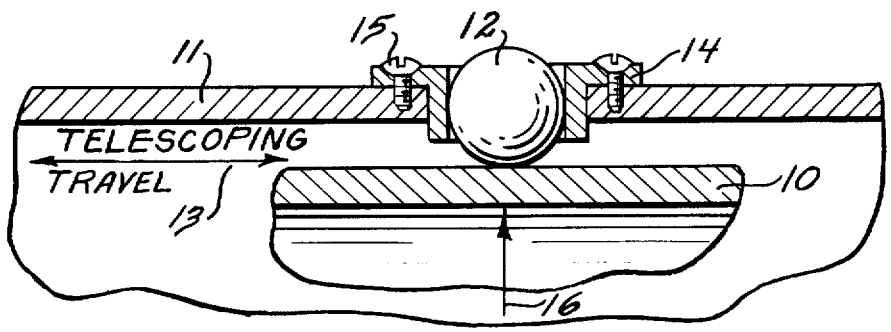
FIG. 1 is a view of a prior art bearing.

Referring to FIG. 1, there is shown the prior art bearing mounting for facilitating movement between the walls of tubes 10 and 11. Tubes 10 and 11 are adjacent concentric tubes of an assembly of telescoping tubes with tube 10 within tube 11. Bearing 12 is supported by the wall of outer tube 11 and is in rotatable contact with the wall of inner tube 10 to facilitate telescoping travel of tube 10 through tube 11 as indicated by arrow 13. Bearing 12 is mounted on piece 14 which is then secured to the exterior of tube 11 with screws 15. Any transverse loading of tube 10 in the direction of arrow 16 will be transmitted through bearing 12 and piece 14 to screws 15, tending to tear screws 15 from tube 11. Note that as tube 10 travels as indicated by arrow 13 some axial force will also be transmitted by friction to screws 15, shimmying them and contributing to fastener breakdown. Since the bearings for all of the tubes of the telescoping tube assembly are similarly mounted, this type of mounting limits the transverse load capacity of the assembly.

Figure 2:
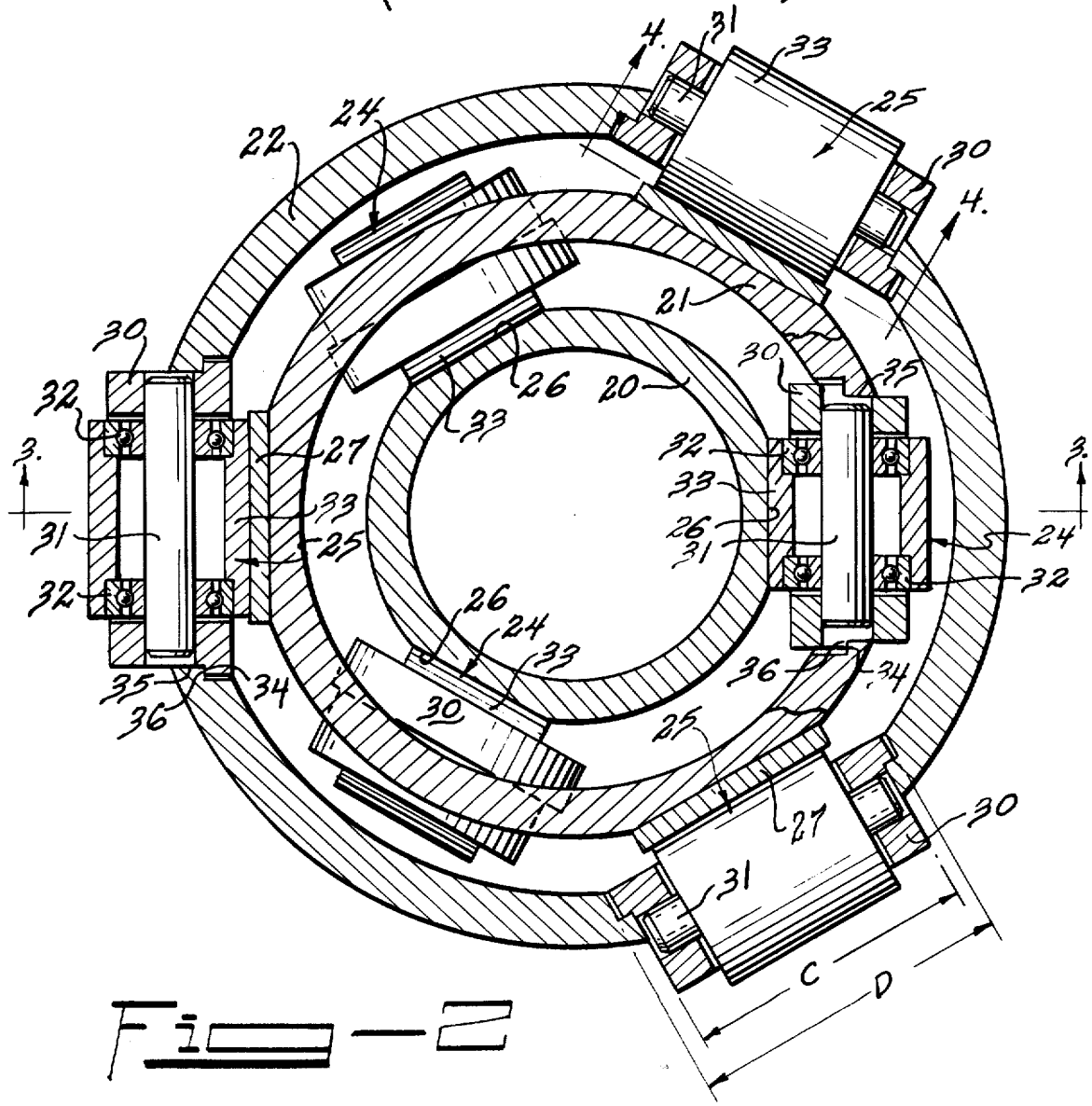
FIG. 2 is a horizontal sectional view of an assembly of telescoping tubes, bearings, and bearing mounting taken on line 2—2 of FIG. 3.
Figure 3:
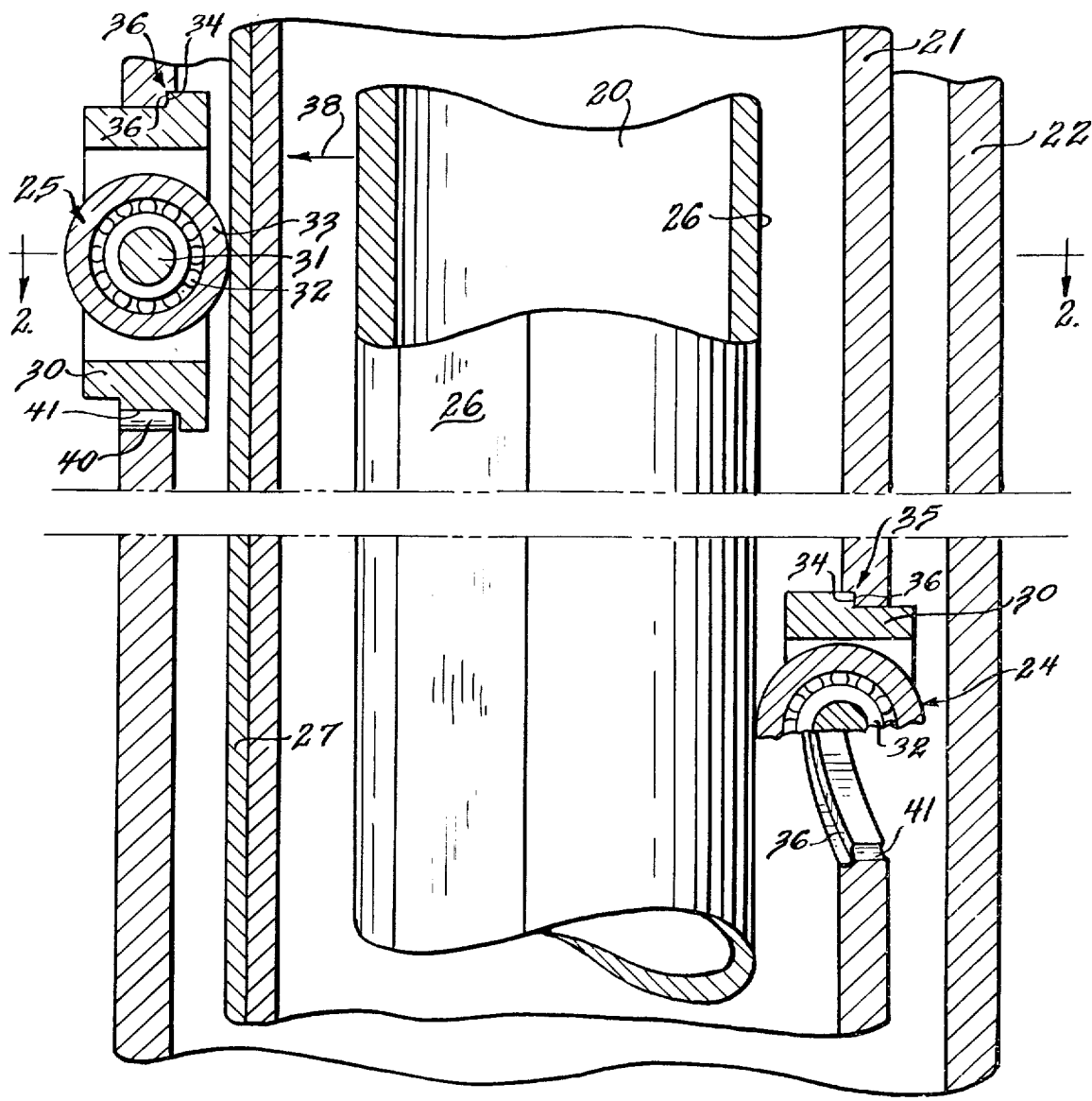
FIG. 3 is a vertical sectional view taken along line 3—3 of FIG. 2 with part of a bearing cut away.

Referring to FIGS. 2 and 3, there is shown an assembly of telescoping tubes, bearings, and the disclosed bearing mounting. Tubes 20, 21, and 22 are adjacent concentric tubes, with tube 20 sliding inside tube 21 and tube 21 sliding inside tube 22. Bearings 24 supported by tube 21 and in rotatable contact with tube 20 facilitate movement of tube 20 through tube 21. Bearings 25 supported by tube 22 and in rotatable contact with tube 21 facilitate the movement of tube 21 through tube 22.

To improve stability by prevention of tube rotation, as would be advantageous in a mechanical manipulator arm, roller bearings may be used. As shown in the drawings, roller bearings 24 and 25 are cylindrical, providing a flat bearing surface against which the tubes may move. Tube 20 is provided with a flattened track surface 26 on its outer surface along which bearings 24 roll. By having three such bearings and tracks arranged symmetrically about each tube, tube rotation is prevented, since tube 20 is wedged between bearings 24. If a tube, such as tube 21, is made of a soft material such as aluminum, then wear-resistant plates 27, which serve as the tracking surface for bearings 25, must be mounted on tube 21 to preserve tube 21 from wearing down.

Figure 4:
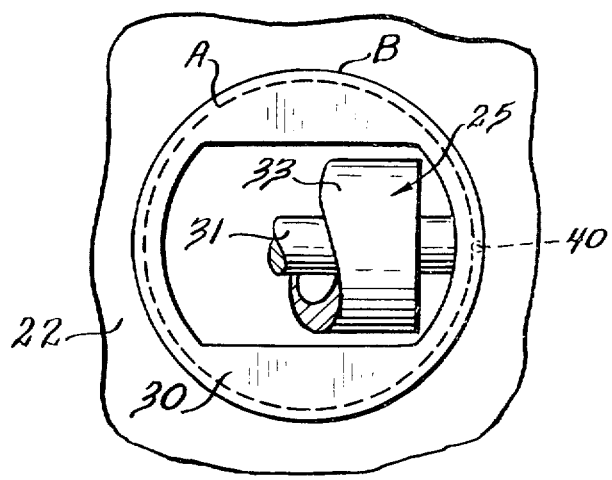
FIG. 4 is a transverse view of the insert piece as taken along line 4—4 of FIG. 2.

Referring to the mountings for bearings 24 and 25 as shown in FIGS. 2, 3, and 4, each mounting includes a mounting piece 30 upon which bearings 24 and 25 are mounted. In the embodiment shown, where bearings 24 and 25 are roller bearings, mounting piece 30 must support shaft 31. About shaft 31 are ball bearings 32 upon which cylinder 33 rotates. In this embodiment, the main body of the mounting piece is of a circular shape defined by circumference "A" and diameter "C". A shoulder 34 is provided, projecting uniformly from and conforming to the circular perimeter of mounting piece 30 and being defined by circumference B and diameter D. Shoulder 34 should be of sufficient height and thickness to withstand forces applied to mounting piece 30. For example, if the diameter C is 2 inches, shoulder 34 may project 1/16 inch from the main body of mounting piece 30 so that the diameter D would be 2-⅛ inches and shoulder 34 may be 3/16 inch thick. Mounting piece 30 allows cylindrical bearings 24 and 25 to project from the body of mounting piece 30 and to rotate in their normal manner so that an object contacting the projecting portion of bearings 24 and 25 can move against bearings 24 and 25, causing bearings 24 and 25 to rotate.

Sockets 35 are positioned on the inside walls of tubes 21 and 22 so that each socket 35 is positioned facing a flat tracking surface 26 of tube 20 or wear-resistant plate 27 of tube 21. Socket 35 is designed to conform generally to the shape of mounting piece 30. Since in this embodiment mounting 30 is circular, socket 35 is also circular and may be formed by boring a first hole of appropriate diameter into the interior walls of tubes 21 and 22 to accommodate the main body of mounting piece 30 as defined by circumference A and diameter C. It is necessary that socket 35 have a shelf 36 so that with mounting piece 30 inserted into socket 35, shoulder 34 lodges against shelf 36, impeding further insertion of mounting piece 30. In the circular embodiment described here, the shelf may be formed by counterboring a second hole with the same center as but of larger diameter than the first hole bored in tubes 21 and 22. The second hole should be of sufficient diameter to accommodate shoulder 34 as defined by circumference B and diameter D. If shoulder 34 is made to conform to the surface configuration of the interior wall of the tubes, then a second hole need not be drilled and the interior wall of the tube functions as shelf 36. Note that the insertion of mounting piece 30 in tubes 21 and 22 is done so that the projecting portion of bearings 24 and 25 will extend from the interior surface of tubes 21 and 22. With tubes 20 and 21 positioned within tubes 21 and 22, respectively, and with mounting pieces 30 inserted in sockets 35, tubes 20 and 21 will be in contact with bearings 24 and 25, respectively. The positioning of tubes 20 and 21 in contact with bearings 24 and 25 maintains mounting pieces 30 in sockets 35. After insertion of mounting piece 30, there is placed into pin hole 41, which extends through socket 35 and mounting piece 30, pin 40. Pin 40 insures that mounting piece 30 is properly aligned and prevents rotation of mounting piece 30 within socket 35.

The effect of transverse loading on a bearing mounting may be shown using FIG. 3. Under transverse loading, in the direction of arrow 38, tube 21 through wear plate 27 transmits the transverse force through bearing 25 to mounting piece 30. All force is then transmitted from shoulder 34 of mounting piece 30 to shelf 36 of socket 35. Therefore the load limiting of the bearing mounting is determined by the strength of shoulder 34 and shelf 36. For the mounting to fail, either shoulder 34 must crack or the tube wall which forms the body of socket 35 and sheld 36 must crack. Note that any axial force perpendicular to arrow 38 transmitted to mounting piece 30 which might also tend to loosen a screw grip will be resisted by the body of socket 35 pressing against the main body of mounting piece 30.

The embodiments of the invention in which an exclusive property or privilege is claimed are defined as follows:

1. In an assembly of telescoping tubes including at least a hollow outer tube with an inner tube positioned within and capable of translation through the hollow outer tube, the outer tube having an opening extending radially from the inner wall of the outer tube, and a bearing mounted in a mounting structure positioned on the outer tube in rotatable contact with said inner tube, said mounting structure for the bearing comprising; a shelf in the form of a portion of the inner wall of the outer tube extending outwardly from the perimeter of the opening recessed from surrounding portions of the inner wall, and a mounting piece for holding and positioning the bearing, said mounting piece having a first end from which said bearing protrudes and a second end on the opposite side of said mounting piece from said first end, said second end being of cross sectional configuration capable of being inserted into the opening and having a shoulder in the form of a solid projection extending outwardly from the body of said mounting piece between said first end and said second end, the cross section of said mounting piece through said shoulder being of such shape that with said second end of said mounting piece positioned within said opening said cross section of said mounting piece through said shoulder extends beyond the opening at the inner wall and is encompassed within said recess and said shoulder is in contact with said shelf so that with said mounting piece positioned within the opening said bearing is in rotatable contact with the exterior surface of the inner tube and forces exerted by the inner tube against the bearing act to displace said mounting piece radially from and axially to the inner tube, said shelf in contact with said shoulder and said second end positioned within said opening acting to oppose said displacement, thereby maintaining the bearing in position within the opening and in rotatable contact with the inner tube.

2. The device of claim 1 wherein the opening is of circular cross section of first diameter, said recessed shelf is a counterbore of second diameter greater than said first diameter on the inside of the outer tube, and said mounting piece is in the form of a cylinder with one end of said cylinder being said second end of said mounting piece and being of said first diameter and the other end of said cylinder being said first end of said mounting piece and having a diameter greater than said first diameter and less than or equal to said second diameter, thereby forming said shoulder.

* * * * *